United States Patent Office 2,905,717
Patented Sept. 22, 1959

2,905,717

PRODUCTION OF QUATERNARY PHOSPHONIUM HALIDES

Wilhelm Sarnecki and Horst Pommer, both of Ludwigshafen (Rhine), Germany, assignors to Badische Anilin- & Soda-Fabrik Aktiengesellschaft, Ludwigshafen (Rhine), Germany No Drawing. Application June 25, 1957
Serial No. 667,978

Claims priority, application Germany June 29, 1956

7 Claims. (Cl. 260—606.5)

This invention relates to a new and improved process for the production of quaternary phosphonium halides.

Quaternary phosphonium halides have hitherto been prepared by allowing organic halogen compounds to act on tertiary phosphines.

We have now found that quaternary phosphonium halides are obtained more advantageously and in excellent yields and purity by reacting the hydrohalides obtainable from tertiary phosphines and hydrogen halide with saturated or unsaturated aliphatic, aromatic-aliphatic or cycloaliphatic hydroxy compounds.

The reaction proceeds, for example in the case of the reaction of triphenyl phosphine hydrobromide with normal butanol, according to the following scheme:

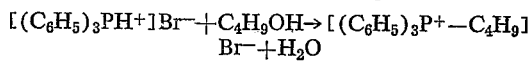

Instead of triphenyl phosphine hydrobromide there may also be used the hydrochloride or the corresponding hydrohalides of other tertiary phosphines. Tertiary phosphines, in the purport of this invention, are meant to denote phosphine the three hydrogen atoms of which are substituted by equal or different aromatic radicals which phosphines have the general formula

wherein the radicals $R_1$, $R_2$ and $R_3$ are monocyclic aromatic groups. As examples of aromatic radicals we mention phenyl, metatolyl, ortho-tolyl, para-tolyl and anisyl. Instead of the alkyl or alkoxy substituent groups or in addition thereto the aromatic radicals may also contain different substituents, as for example halogen or nitro groups. From among the said monovalent monocyclic aryl phosphines we select tri-paratolylphosphine, trianisylphosphine and tri-parachlorphenyl phosphine as preferred examples. Suitable hydroxy compounds are primary or secondary saturated and unsaturated aliphatic, cycloaliphatic and aromatic-aliphatic monohydric or polyhydric alcohols i.e., alcohols with more than one hydroxy group, which may also bear substituents which are nonreactive under the conditions of the reaction, such as ether groups (alkoxy groups), esterified hydroxyl groups, free carboxyl groups, carboxyl groups esterified with alkanols, nitro and nitrile groups. The polyhydric hydroxy compounds can enter into reaction with only one molecule of the phosphine hydrohalide or with two or more molecules. The hydroxy compounds are primary and secondary alcohols having the general formula

wherein R can be an alkyl radical, an alkenyl radical, a cycloalkyl radical, a phenylalkyl radical, a cycloalkenyl-alkyl radical or a cycloalkenyl-alkenyl radical which radicals can have as substituents the above mentioned groups.

The aliphatic hydroxy compounds may have a low or high molecular weight. Suitable compounds of the said kind are the alkyl alcohols methyl alcohol, hexyl alcohol, decyl alcohol, stearyl alcohol, cetyl alcohol and myricyl alcohol. Examples of cycloaliphatic hydroxy compounds applicable in the practice of our invention are the cycloalkyl alcohols cyclohexanol, cyclooctanol and hydroxy-decahydronaphthalene. The unsaturated aliphatic or cycloaliphatic compounds can have one or more carbon-carbon double and triple linkages and therefore can be, for example, alkenyl or cycloalkenyl compounds. Suitable aromatic-aliphatic hydroxy compounds are those having at least one hydroxy group attached to the aliphatic radical, as for example the phenyl-alkyl alcohol benzyl alcohol. It is impossible and in fact unnecessary that all hydroxy compounds which can be used for the production of quaternary phosphonium halides by the method of our invention should be enumerated. The teaching that compounds that contain aliphatically combined hydroxy groups in addition, if any, to aromatically combined hydroxy groups, but contain no further groups capable of reacting with tertiary phosphines clearly indicates to any worker in the art what particular substance to use.

The reaction between the tertiary phosphine hydrohalide and the hydroxy compound can be initiated by mixing the components. Desirably the reaction is carried out at a temperature between minus 20° C. and plus 120° C. in the presence of solvents.

The water formed in the reaction can be removed for example by distillation or by the addition of water-binding agents. The removal of the water of reaction is not by any means always necessary, but is especially of advantage when the crystallization of the phosphonium halides formed is wholly or partly disturbed by the presence of water.

For the removal of the water formed in the reaction when such removal is desired, the reactants are preferably heated with an inert volatile solvent or diluent which distils over with the water formed and which can be returned again to the reaction vessel after cooling and separating the water if desired. As solvents or diluents there may be used aliphatic or aromatic hydrocarbons which are liquid at room temperature or melt within the range from normal to the boiling temperature of water. The solvents may bear groups of low reactivity, such as is the case, for example, with anisol or nitrobenzene. They may also be miscible with water, for example benzene, toluene, xylene, ether, tetrahydrofuran, dioxane, 2,5-dimethyltetrahydrofuran, nitrobenzene, dimethyl formamide, acetonitrile and nitroalkanes, to which water-binding agents, such as silica gel or anhydrous sodium sulphate, may be added.

Water-binding agents are meant to include such substances as have a marked tendency to add on water physically or in complex form, also in the presence of organic solvents. It is known to any worker in the art which agents are to be used in each particular case. It is often of advantage to use as diluent an excess of the hydroxy compound used for the reaction.

The process according to this invention permits the production of quaternary phosphonium halides in a surprisingly simple way from hydroxyl compounds of a great variety of kinds without it being necessary, as hitherto, first to convert these into the corresponding alkyl halides. Whereas in the conversion of alcohols into alkyl halides with the aid of phosphorus halides, especially in the case of unsaturated alcohols, undesirable side reactions often occur, such as the migration of the double linkages or polymerization, these were not observed in the process according to this invention. It therefore represents a valuable enrichment of the art.

The quaternary phosphonium halides, depending on their constitution, can find employment for example as textile auxiliaries, as pesticides or as medicaments. It is especially important that by treatment with agents binding hydrogen halide, such as organometallic compounds or alkali amides or alcoholates, they can be converted into so-called phosphine ylides (cf. G. Wittig and U. Schöllkopf, Chem. Ber. 87 (1954), page 1318 and the copending application U.S. Serial Number 534,156). Phosphine ylides are important intermediate products for the production of unsaturated compounds, for example of the vitamin-A or carotinoid series.

The following examples will further illustrate this invention but the invention is not restricted to these examples. The parts specified in the examples are parts by weight.

Example 1

34 parts of triphenyl phosphine hydrobromide are boiled in an apparatus fitted with a circulation with 200 parts of normal butanol so that the normal butanol distilled off is separated in known manner from entrained water in a separator and then led back into the boiling vessel. As soon as water no longer passes over, the excess of normal butanol is distilled off; the crystalline residue is stirred with a little ether or benzene and filtered by suction. 30 parts of pure normal butyl triphenyl phosphonium bromide of the melting point 230° C. are obtained.

Example 2

8 parts of butene-(2)-diol-(1,4) are stirred with 57 parts of triphenyl phosphine and 36 parts of 46% hydrobromic acid for 2 hours at room temperature; the hydrobromide of triphenyl phosphine is thereby formed. 150 parts of benzene are then added and the mixture heated in the way described in Example 1 until water no longer passes over. The benzene is then distilled off and the residue recrystallized from a little absolute ethanol. 60 parts of the bis-quaternary phosphonium salt of the formula:

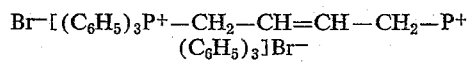

of the melting point 255° to 257° C. are obtained.

Example 3

16 parts of beta-cyclogeraniol i.e., the cycloalkenyl-alkyl alcohol, of the formula

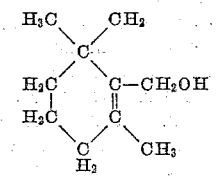

and 26 parts of triphenyl phosphine are dissolved in 100 parts of benzene, 18 parts of 46% hydrobromic acid gradually added at 40° C. while stirring, the whole further stirred for 10 hours and then heated in the way described in Example 1 until water no longer passes over. Upon cooling, the beta-cyclogeranyl triphenyl phosphonium bromide begins to crystallize out. The separation is completed by the addition of 50 parts of absolute tetrahydrofuran and the whole then filtered by suction. The yield amounts to 36 parts. The pure phosphonium salt melts at 197° to 199° C.

Example 4

A mixture of 40 parts of beta-ionol, i.e., the cycloalkenyl-alkenyl alcohol of the formula

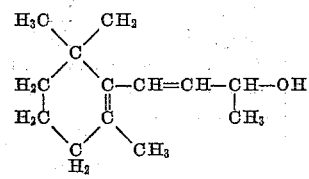

52 parts of triphenyl phosphine, 36 parts of 46% hydrobromic acid and 150 parts of benzene is stirred for 12 hours at room temperature and then heated in the way described in Example 1 until water no longer passes over. By cooling, a heavy oil separates out which after separation of the benzene layer and repeated stirring with fresh benzene and with absolute ether, finally is converted into a white, flocculent mass. The yield amounts to 105 parts. The compound begins to swell up at about 65° C. and melts at 140° C. It exhibits the properties to be expected for beta-ionyl triphenyl phosphonium bromide; thus it can be converted into beta-ionylidene triphenyl phosphine by reaction with normal butyl lithium.

Example 5

34 parts of triphenyl phosphine hydrobromide and 8 parts of glycol monomethyl ether are boiled under reflux for 7 hours with 50 parts of absolute tetrahydrofuran. After cooling there separate 17 parts of (beta-methoxyethyl)-triphenyl phosphonium bromide. A further 7 parts are obtained by concentrating the mother liquor. The product melts at 216° C.

Example 6

26 parts of triphenyl phosphine, 11 parts of benzyl alcohol and 10 parts of concentrated hydrochloric acid are boiled with 150 parts of benzene for 4 hours in the way described in Example 1 in a circulating apparatus, a further 20 parts of concentrated hydrochloric acid being gradually dripped in. The benzene is then distilled off and the oily residue stirred with 50 parts of absolute tetrahydrofuran. 17 parts of benzyl triphenyl phosphonium chloride of the melting point 298° to 301° C. are obtained.

Example 7

102 parts of triphenyl phosphine hydrobromide are stirred with 48 parts of geraniol an unsaturated aliphatic alcohol of the formula

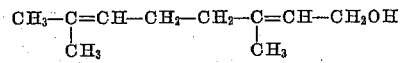

in 150 parts of absolute tetrahydrofuran for 14 hours at room temperature. 56 parts of geranyl triphenyl phosphonium bromide are precipitated. A further 14 parts can be obtained by concentration of the mother liquor. The product melts at 170° to 172° C.

Example 8

26 parts of triphenyl phosphine and 16 parts of beta-cyclogeraniol are stirred in 50 parts of absolute tetrahydrofuran, while a mixture of 21 parts of a 39% solution of hydrogen bromide in glacial acetic acid with 10 parts of acetic anhydride is gradually added. After 14 hours, the solvent is distilled off in a water jet vacuum and the residue stirred with 50 parts of absolute tetrahydrofuran. 31 parts of beta-cyclogeranyl triphenyl phosphonium bromide of the melting point 200° to 201° C. thereby separate.

Example 9

34 parts of triphenyl phosphine hydrobromide, 16 parts of beta-cyclogeraniol, 20 parts of silica gel and 80 parts of tetrahydrofuran are stirred for 24 hours at room temperature. The precipitated salt is filtered off together with the silica gel and dissolved with alcohol. After filtering off the silica gel, the alcoholic solution is evaporated to dryness. There remain 25 parts of beta-cyclogeranyl triphenyl phosphonium bromide. A further 7 parts are obtained by concentrating the tetrahydrofuran mother liquor. The product melts at 201° C.

Example 10

34 parts of triphenyl phosphine hydrobromide, 9 parts of butene-(2)-diol(1,4) and 50 parts of absolute tetrahydrofuran are stirred for 30 hours at room temperature. 24 parts of (4-hydroxy-butene-(2)-yl) triphenyl phosphonium bromide separate out. A further 12 parts can be obtained by concentrating the mother liquor. After recrystallization from alcohol or water, the melting point of the product lies at 214° to 216° C.

*Example 11*

34 parts of triphenyl phosphine hydrobromide, 13 parts of 4-hydroxy-3-methyl-butene-(2)-acid-(1)-methyl ester and 50 parts of absolute tetrahydrofuran are stirred for 24 hours at room temperature. 30 parts of (2-methyl-3-carbomethoxy-propene-(2)-yl) triphenyl phosphonium bromide separate out. A further 5 parts are obtained by concentration of the mother liquor. The product melts at 160° C.

*Example 12*

30 parts of triphenylphosphine hydrochloride and 11 parts of glycol monoacetic acid ester are boiled in 50 parts of absolute tetrahydrofuran for 7 hours under reflux. After cooling absolute ether is added with vigorous agitation until the crystallization of the phosphonium salt begins. After stirring at 0° C. for 3 hours the crystals are filtered off and washed with absolute tetrahydrofuran, 14 parts of (beta-acetoxy-ethyl)-triphenyl-phosphonium chloride having a melting point of 201° to 203° C. being obtained.

What we claim is:

1. A process for the production of a quaternary phosphonium halide which comprises reacting a tertiary phosphine hydrohalide of the general formula $$PR_1R_2R_3 \cdot HX$$

wherein the radicals $R_1$, $R_2$, and $R_3$ are members selected from the group consisting of phenyl and phenyl having a hydrogen atom substituted by a radical selected from the group consisting of a lower alkyl, methoxy, nitro and halogen, and X is halogen with a hydroxy compound selected from the group consisting of primary and secondary alcohols of the general formula $$ROH$$

wherein R is a member selected from the group consisting of an alkyl radical, an alkenyl radical, and a cycloalkyl radical, said alkyl radical having from zero to one substituents selected from the group consisting of a hydroxyl group, a lower alkoxy group, a hydroxyl group esterified with a lower alkanoic acid, a carboxyl group, a carboxyl group esterified with a lower alkanol, a nitro group, a nitrile group, a cycloalkenyl group, and a phenyl group and said alkenyl radical having from zero to one substituents selected from the group consisting of a hydroxyl group, a lower alkoxy group, a carboxyl group, a carboxyl group esterified with a lower alkanol, a nitro group, a nitrile group, and a cycloalkenyl group.

2. The process as claimed in claim 1 wherein ROH is

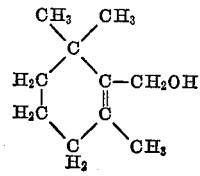

3. The process as claimed in claim 1 wherein ROH is

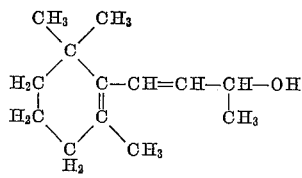

4. A process for the production of a quaternary phosphonium halide which comprises reacting a tertiary phosphine hydrohalide of the general formula: $PR_1R_2R_3 \cdot HX$, wherein the radicals $R_1$, $R_2$, and $R_3$ are members selected from the group consisting of phenyl and phenyl having a hydrogen atom substituted by a radical selected from the group consisting of a lower alkyl, methoxy, nitro and halogen, and X is halogen with a hydroxy compound selected from the group consisting of primary and secondary alcohols of the general formula: ROH, wherein R is an alkenyl radical having as a link to the hydroxyl group the radical

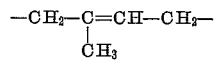

5. The process as claimed in claim 4 wherein ROH is

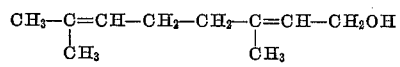

6. The process for the production of a quaternary phosphonium halide which comprises reacting by mixing together in an inert organic volatile liquid a tertiary phosphine of the general formula: $PR_1R_2R_3$, wherein the radicals $R_1$, $R_2$, and $R_3$ are members selected from the group consisting of phenyl and phenyl having a hydrogen atom substituted by a radical selected from the group consisting of a lower alkyl, methoxy, nitro and halogen; a hydrogen halide; and a hydroxy compound selected from the group consisting of primary and secondary alcohols of the general formula: ROH, wherein R is a member selected from the group consisting of an alkyl radical, an alkenyl radical, and a cycloalkyl radical, said alkyl radical having from zero to one substituents selected from the group consisting of a hydroxyl group, a lower alkoxy group, a hydroxyl group esterified with a lower alkanoic acid, a carboxyl group, a carboxyl group esterified with a lower alkanol, a nitro group, a nitrile group, a cycloalkenyl group, and a phenyl group and said alkenyl radical having from zero to one substituents selected from the group consisting of a hydroxyl group, a lower alkoxy group, a carboxyl group, a carboxyl group esterified with a lower alkanol, a nitro group, a nitrile group, and a cycloalkenyl group.

7. The process as claimed in claim 6 wherein said mixture is heated at any temperature up to 120° C.

References Cited in the file of this patent

Kosolapoff: "Organophosphorus Compounds," John Wiley & Sons, Inc., New York (1950), page 82.